(12) United States Patent
Job et al.

(10) Patent No.: US 10,280,958 B2
(45) Date of Patent: May 7, 2019

(54) TAPERED CLIPS

(71) Applicant: Ford Global Technologies, LLC, Dearborn, MI (US)

(72) Inventors: David Job, Viewbank (AU); Dale Travis Huggan, Sunbury (AU)

(73) Assignee: Ford Global Technologies, LLC, Dearborn, MI (US)

( * ) Notice: Subject to any disclaimer, the term of this patent is extended or adjusted under 35 U.S.C. 154(b) by 53 days.

(21) Appl. No.: 15/672,059

(22) Filed: Aug. 8, 2017

(65) Prior Publication Data
US 2018/0051727 A1 Feb. 22, 2018

(30) Foreign Application Priority Data
Aug. 19, 2016 (CN) .......................... 2016 1 0698431

(51) Int. Cl.
*F16B 2/22* (2006.01)
*B62D 25/16* (2006.01)
*F16B 5/12* (2006.01)

(52) U.S. Cl.
CPC .............. *F16B 2/22* (2013.01); *B62D 25/163* (2013.01); *F16B 5/126* (2013.01); *F16B 5/128* (2013.01)

(58) Field of Classification Search
CPC .. F16B 2/22; F16B 5/126; F16B 5/128; F16B 5/0664; Y10T 24/303; Y10T 24/309; Y10T 24/307; Y10T 24/45105; Y10T 24/44026
See application file for complete search history.

(56) References Cited

U.S. PATENT DOCUMENTS

| | | | |
|---|---|---|---|
| 2,959,259 A * | 11/1960 | Meyer ................. | F16B 5/125 24/295 |
| 3,080,629 A * | 3/1963 | Meyer ................. | F16B 5/123 24/297 |
| 5,662,375 A | 9/1997 | Adams et al. | |
| 6,101,666 A | 8/2000 | Velthoven, et al. | |
| 6,857,168 B2 * | 2/2005 | Lubera ............... | B60N 3/026 24/293 |
| 9,049,905 B2 | 6/2015 | Perez | |
| 2007/0107174 A1 | 5/2007 | Bordas | |

FOREIGN PATENT DOCUMENTS

DE 102010049795 A1 5/2012

* cited by examiner

*Primary Examiner* — Robert Sandy
(74) *Attorney, Agent, or Firm* — Vichit Chea; Kolitch Romano LLP

(57) ABSTRACT

A tapered clip comprises a base; and a clip body connected to the base and moveable relative to the base. The clip body includes a clipping member, and the clipping member includes a clip surface having a first clip edge and a second clip edge next to the first clip edge. The first clip edge forms a first angle with a plane that is perpendicular to a clip engagement direction and the second clip edge forms a second angle with the plane.

20 Claims, 5 Drawing Sheets

TAPERED CLIPS

RELATED APPLICATION

This application claims the benefit of Chinese Patent Application No.: CN 201610698431.9 filed on Aug. 19, 2016, the entire contents thereof being incorporated herein by reference.

FIELD

The present disclosure relates generally to a clip to connect components, in particular, relates to a clip with a clip surface tapered relative to a clip engagement direction.

BACKGROUND

Clips are widely used to connect a component or provide connections between components permanently or temporarily. For example, a part such as a fender in a vehicle includes multiple plastic clips to connect a metal sheet of the fender with other components. The conventional clips have a very narrow clip range in a clip engagement direction. A clip ramp angle determines a clip clamp width which is the width the clip can tolerate while maintaining a full clamp load. A large clip clamp angle can increase the clip clamp width but reduce the clamp retention. A small clip clamp angle makes it difficult for a component to be engaged with the connection component. Thus, there exists a need for a clip having a wider clamp range while maintaining desired retention strength.

SUMMARY

According to one aspect, a tapered clip is provided. The tapered clip may comprise a base; and a clip body connected to the base and moveable relative to the base. The clip body may include a clipping member, and the clipping member may include a clip surface having a first clip edge and a second clip edge next to the first clip edge. The first clip edge may form a first angle with a plane that is substantially perpendicular to a clip engagement direction, and the second clip edge may form a second angle with the plane.

In one embodiment, the first clip edge and the second clip edge may form an interior angle that is substantially equals to 90 degrees.

In another embodiment, the first clip edge and the second clip edge may form an interior angle that is greater than 90 degrees.

In another embodiment, the first angle may be different from the second angle.

In another embodiment, the clip surface may be a flat surface.

In another embodiment, the clip body and the base may be made from plastic, and wherein the clip body and the base are integrally formed.

In another embodiment, the base may include two legs and a top portion connecting the two legs; and the clip body may include a support member disposed between the top portion of the base and the clipping member; and the clipping member may be configured to protrude from an end of the support member over a surface of the support member.

In another embodiment, the clip body may further include sidewalls protruding from edges of the support member and connecting the clipping member and the sidewalls may have a curved outer surface sloped to the top portion of the base.

According to another aspect, a tapered clip may comprise a base including a top portion; and a clip body. The clip body may include a support member connected to the top portion of the base, and a clipping member disposed on a free end of the support member. The clipping member may include a first clip edge and a second clip edge, and the second clip edge is next to the first clip edge and opposite to the support member. The clipping member may have a tapered surface. In a X, Y, Z coordinate system with a Z axis parallel to a length direction of the base, projection of the first clip edge on a Y-Z plane may form a first angle with a Y axis, and projection of the second clip edge on a X-Z plane may form a second angle with an X-axis In one embodiment, projection of the second clip edge on a X-Y plane may form a third angle with the X axis.

In another embodiment, the clip body and the base may be made from plastic, and the clip body and the base may be integrally formed. The clip body may be capable of rotating relative to the base.

According to another aspect, a clip assembly is provided. The clip assembly may include a connecting component including a clip retention opening with a clip engagement edge; and a clip to be engaged with the clip engagement edge of the connecting component. The clip may include in a base, and a clip body connected to the base and moveable relative to the base. The clip body may include a clipping member, and the clipping member includes a clip surface having a first clip edge and a second clip edge next to the first clip edge. The first clip edge may form a first angle with a plane that is perpendicular to a clip engagement direction, and the second clip edge may form a second angle with the plane. Either the first clip edge or the second clip edge may contact the clip engagement edge of the connecting component when the clip is engaged with the connecting component.

In one embodiment, an interior angle between the first clip edge and the second clip edge may substantially equal to 90 degrees.

In another embodiment, an interior angle between the first clip edge and the second clip edge may be greater than 90 degrees.

In another embodiment, the clip body and the base may be made from plastic, and the clip body and the base may be integrally formed.

In another embodiment, the base may include two legs and a top portion connecting the two legs; and the clip body may include a support member disposed between the top portion of the base and the clipping member; and the clipping member may be configured to protrude from an end of the support member over a surface of the support member, the second clip edge may be opposite to the surface.

In another embodiment, the clip body may further include sidewalls protruding from edges of the support member and connecting the clipping member and the sidewalls may have a curved outer surface sloped to the top portion of the base.

The tapered clip of the present disclosure is advantageous because it provides a wide clamp range while maintaining sufficient retention strength. The tapered clip engages with the connection component at a first clip edge or a second clip edge and the engagement positions may be point contact. In this way, the tapered clip can maintain retention with the connecting component at many positions.

BRIEF DESCRIPTION OF THE DRAWINGS

Example embodiments will be more clearly understood from the following brief description taken in conjunction

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed clips will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various clips are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
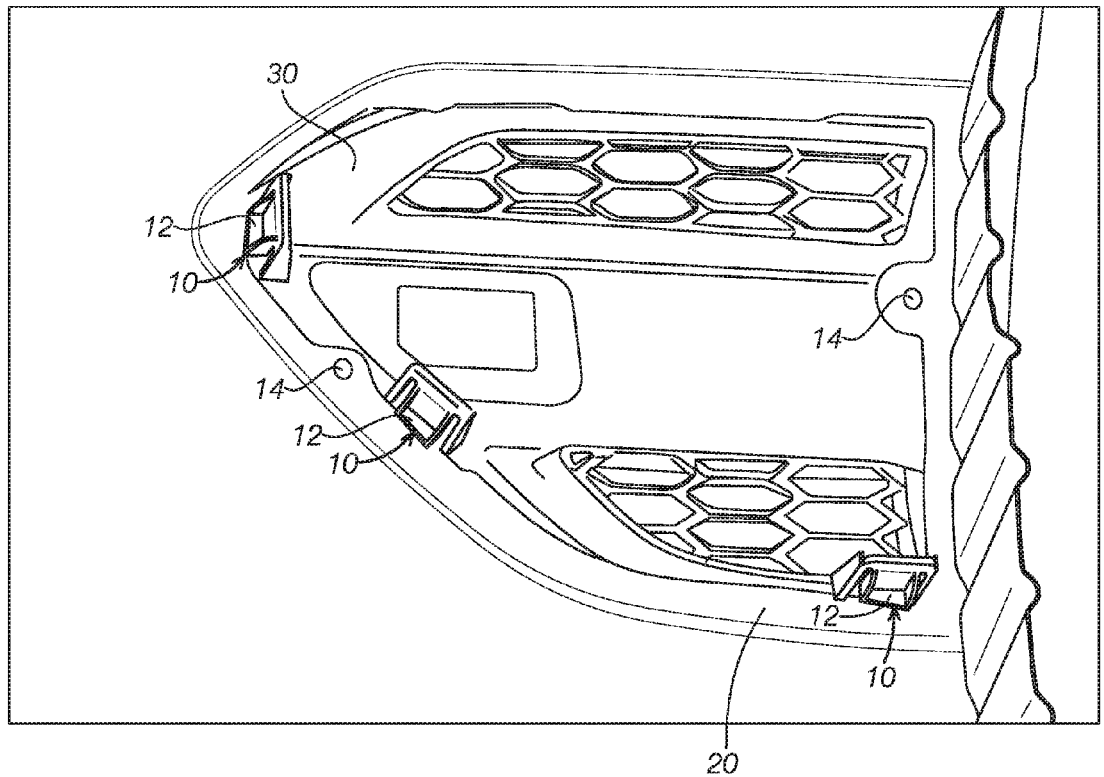
FIG. 1 is a perspective view of example clips and a connecting component, illustrating the engagement of the clips with the connecting component.

FIG. 1 is a perspective view of example clip 10 and a connecting component 20, illustrating the engagement of the clips with the connecting component 20. In the depicted example, the connecting component 20 is a fender of a vehicle. The connecting component 20 is coupled to an engaging component 30 via the clip 10 attached to the engaging component 30. In the depicted embodiment, a base of the clip 10 is connected to the engaging component 30. As shown in FIG. 1, a plurality of clips 10 are disposed along a peripheral of the connecting component 20. A clipping member 12 of each clip 10 is engaged to the connecting component 20. The engagement of the clips 10 with the connecting component 20 establishes connection between the clips 10 and the connecting component 20 and thus couples the engaging component 30 with the connecting component 20.

Figure 2:
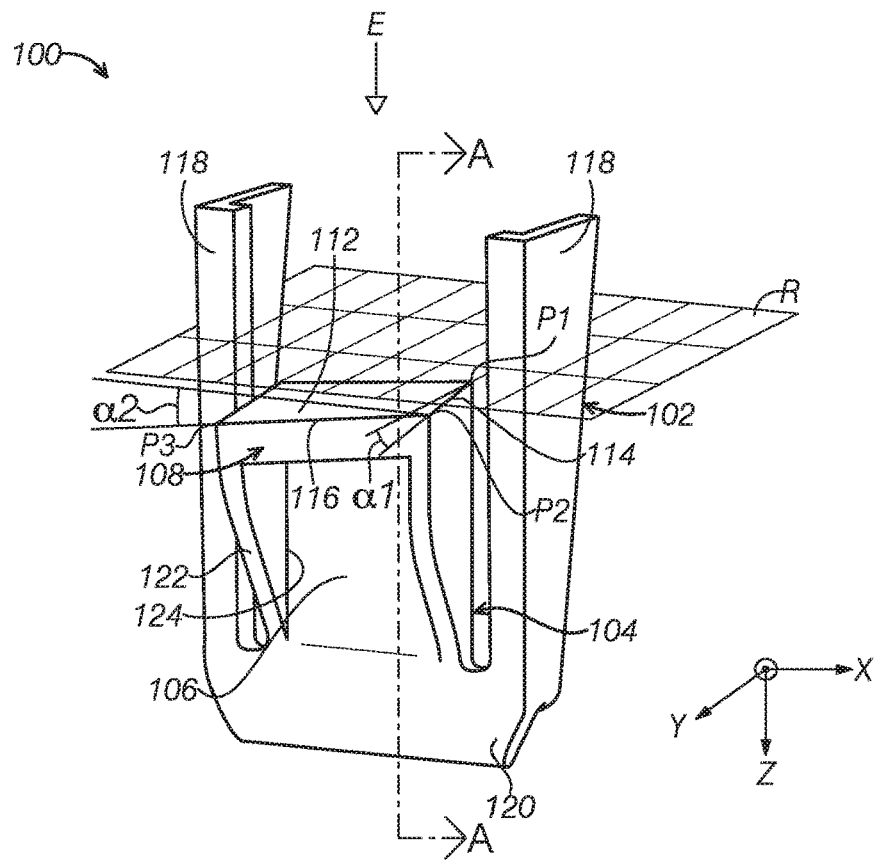
FIG. 2 is a perspective view of an example clip according to an embodiment of the present disclosure.

In some embodiments, aligning features may be provided to maintain the positions of the connecting component 20 and the engaging component 30. For example, the connecting component 20 may include holes 14 and the engaging component 30 may include locating pins (not shown). The locating pins pass through the holes 14 so that the connecting component 20 and the engaging component 30 are located relative each other at a predetermined position. With further reference to FIG. 2, when the connecting component 20 and the engaging component 30 are maintained at the predetermined position by the aligning feature, the clip 10 do not move around in a plane of X-Y so that the effective retention in Z direction can be achieved. It should be appreciated that any appropriate aligning feature may be used.

Figure 3:
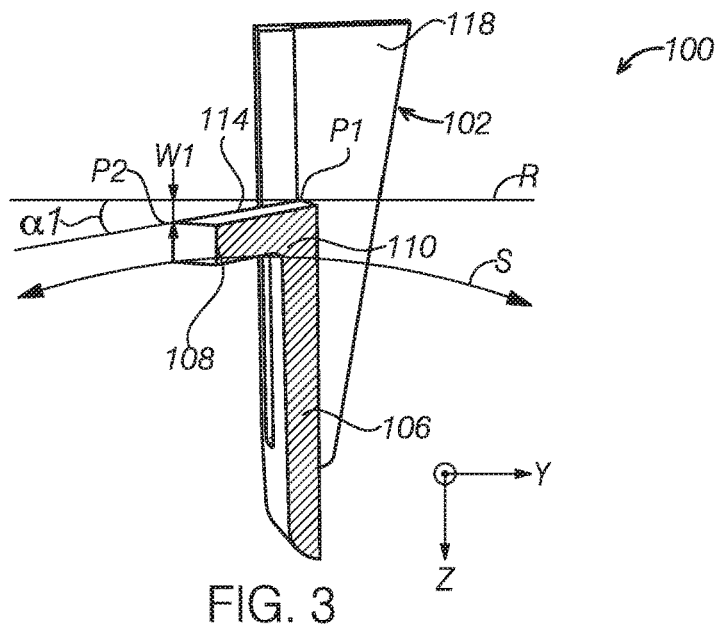
FIG. 3 is a cross-sectional view of the clip shown in FIG. 2 along a section A-A.
Figure 4:
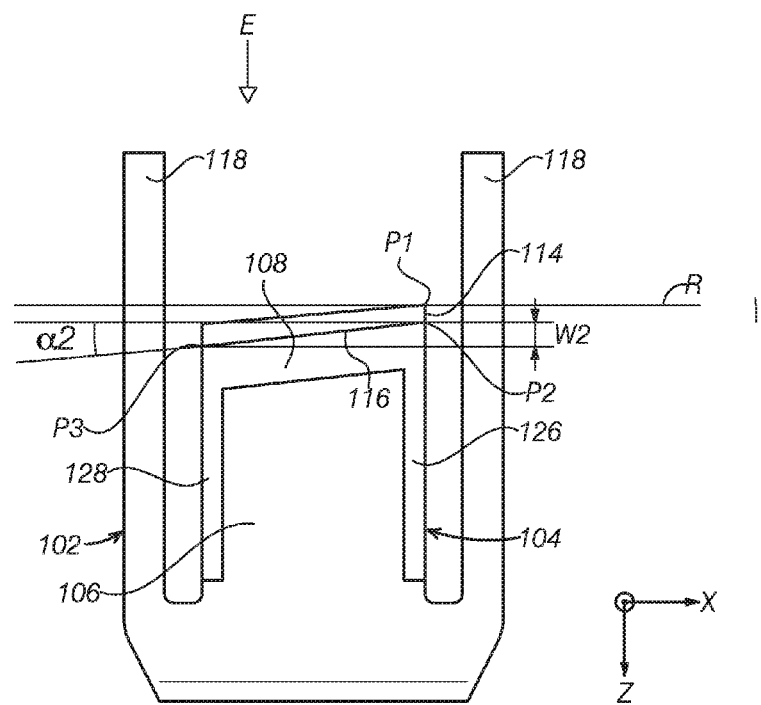
FIG. 4 is a front view of the clip shown in FIG. 2
Figures 5, 6:
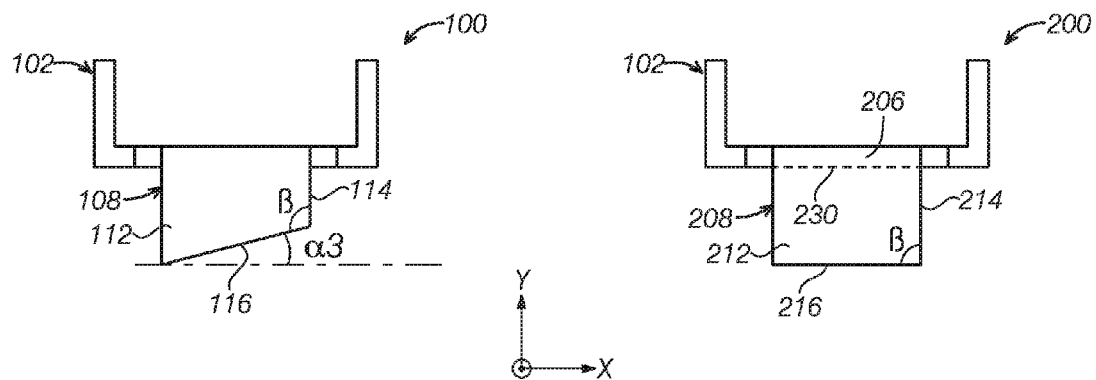
FIG. 5 is a plan view of the clip shown in FIG. 2.
FIG. 6 is a plan view of another embodiment of a clip according to the present disclosure.

FIGS. 2-5 illustrate an example clip 100 according to the present disclosure. FIG. 2 is a perspective view of the clip 100. FIG. 3 is a cross-sectional view of clip 100 along the section A-A in FIG. 2. FIG. 4 is a front view of the clip 100. FIG. 5 is a plan view of the clip 100. Referring to FIGS. 2-5, the clip 100 may include a base 102 and a clip body 104. The clip body 104 may include a support member 106 connected to the base 102 and a clipping member 108. The clipping member 108 may be disposed at a free end of the clip body 104. In some embodiments, the clipping member 108 may protrude from an end 110 of the support member 106.

The clipping member 108 may include a clip surface 112. The clip surface 112 may be a flat surface. In some embodiments, the clip surface 112 may be tapered relative to a clip engagement direction E or tapered relative to a plane R that is perpendicular to the clip engagement direction E. The clip surface 112 may include a plurality of clip edges. For example, the clip surface 112 may have a first clip edge 114 and a second clip edge 116. The second edge 116 may be next to the first clip edge and opposite to or away from the support member 106. In some embodiments, the first clip edge 114 may form a first angle α1 with the plane R. In other words, in a coordinate system with axes X, Y and Z in which the Z is parallel to the clip engagement direction E or a lengthwise direction of the base 102, the projection of the first clip edge 114 on a Y-Z plane including the axes Y and Z may form the angle α1 with the Y axis (see FIG. 3). Along the clip engagement direction E or the Z axis, two end points P1 and P2 of the first clip edge 114 may form a first elevation distance W1, which is the clamp range of the first clip edge 114. FIG. 3 further shows that the clip body 104 may rotate in a path indicated by S.

For a conventional clip with a non-tapered surface, the clamp range is zero, which requires more accurate sizes and/or positioning for the clip and the connecting component in order for them to be engaged. The tapered clip 100 of the present disclosure is advantageous because of the wider clamp range. When the clip 100 moves along the Z axis for the engagement, the first clip edge 114 can contact or retain with the connecting component in the clamp range W1. Further, even there is a relative movement between the clip and the connecting component after the installation process due to the vibration, the clip can maintain retention with the connecting component as long as the movement is within the clamp range W1.

In some embodiments, the second clip edge 116 of the clipping member 108 may form a second angle α2 with the plane R. In other words, the projection of the second clip edge 116 on a X-Z plane including the axes X and Z may form the second angle α2 with the X axis (see FIG. 4). Along the clip engagement direction E or the Z axis, two end points P2 and P3 of the second clip edge 116 form a second elevation distance W2, which is the clamp range of the second clip edge 116.

During the engagement process of the clip 100 with a connecting component, the clip 100 is disposed under the plane R. The second clip edge 116 can engage with the connecting component in a range W2. The clip 100 with a tapered clip surface having two angles α1 and α2 has a wider clamp range (W1+W2) and thus tolerate more variations on the size of connecting component and positioning of the clip during the engagement process.

In some embodiments, the first angle α1 may be same as the second angle α2. In other embodiments, the first angle α1 may be different from the second angle α2.

In some embodiments, the first clip edge 114 and the second clip edge 116 may further form an interior angle β that is greater than 90 degrees. In other words, the projection of the second clip edge 116 on a X-Y plane including the axes X and Y, the second clip edge 116 forms a third angle α3 with the X axis (see FIG. 5). Compared to a clip edge whose projection on the X-Y plane is parallel to the X axis, the second clip edge 116 is longer and thus provides a greater retention distance.

Now referring to FIG. 2 and FIG. 4, an example embodiment of the base 102 and the clip body 104 is described. In the depicted embodiment, the clip body may include a first lateral side 126 and a second lateral side 128 shorter than the first lateral side 126. The base 102 may include two legs 118 and a top portion 120. The clip body 104 may be disposed between the legs 118 and may be moveable relative to the base 102. The support member 106 of the clip body 104 may be connected to the top portion 120. In some embodiments, the clip body 104 may further include sidewalls 122 protruding from edges 124 of the support member 106 and connecting to the clipping member 108. The sidewalls 122 may have a curved outer surface in a portion adjacent to the top portion 120 of the base 102 to facilitate the movement of the clip body 104 toward the connecting component during the engagement process.

The clip body 104 may be configured to be moveable relative to the base 102. In some embodiments, the clip body 104 may be spaced apart from the legs 118. The support member 106 of the clip body 104 may be configured to a have specific length in the clip engagement direction E. In this way, the clip body 104 can be pivoted or rotated to relative to the top portion 120 of the base 102 at a desired range. The support member 106 may be configured to have sufficient stiffness to sustain the retention force and to be capable of being maintained at a specific position. During the engagement process, the clipping member 108 may rotate back and forth before it engages with the connecting component as described in detail with reference to FIGS. 7-9.

The clip body 104 may be made from material of deformable and/or elastic properties so that it can rotate to some extent and return to an original position. For example, the clip body 104 may be made from plastic. Further, the base 102 and the clip body 104 may be made from the same material and integrally formed.

It should be appreciated that the configuration of the base and the clip body are described for illustration purpose and various embodiments are possible. For example, the base of the clip may be connected to an engaging component and the retention of the clip with the connecting component couples the engaging component and the connecting component together. The base of the clip and the clip body may be configured according to the shapes of the engaging component and the connecting component.

FIG. 6 shows a plan view of another embodiment of a clip 200 according to the present disclosure. Hereinafter, the descriptions to the same elements as in the embodiments illustrated in FIGS. 2 to 5 will be omitted or mentioned briefly for the sake of brevity. In other words, differences between the present embodiment and the embodiment of FIGS. 2-5 will be mainly described. The clip 200 may include a base 202 and a clipping member 208 having a first clip edge 214 and a second clip edge 216. FIG. 6 also shows a clip surface 212 of the clipping member 208. Similar to the clip 100, the first clip edge 214 forms a first angle with a plane perpendicular to a clip engagement direction and the second clip edge 216 forms a second angle with the plane (not shown). The difference of the clip 200 from the clip 100 is that the second clip edge 216 is parallel to a surface 230 of a support member 206. In other words, the second clip edge 216 forms an interior angle β that is substantially equal to 90 degrees. In some embodiments, the clipping member 208 may have a rectangular shape. It should be appreciated that the clipping member 208 may have any appropriate shape.

Figure 7:
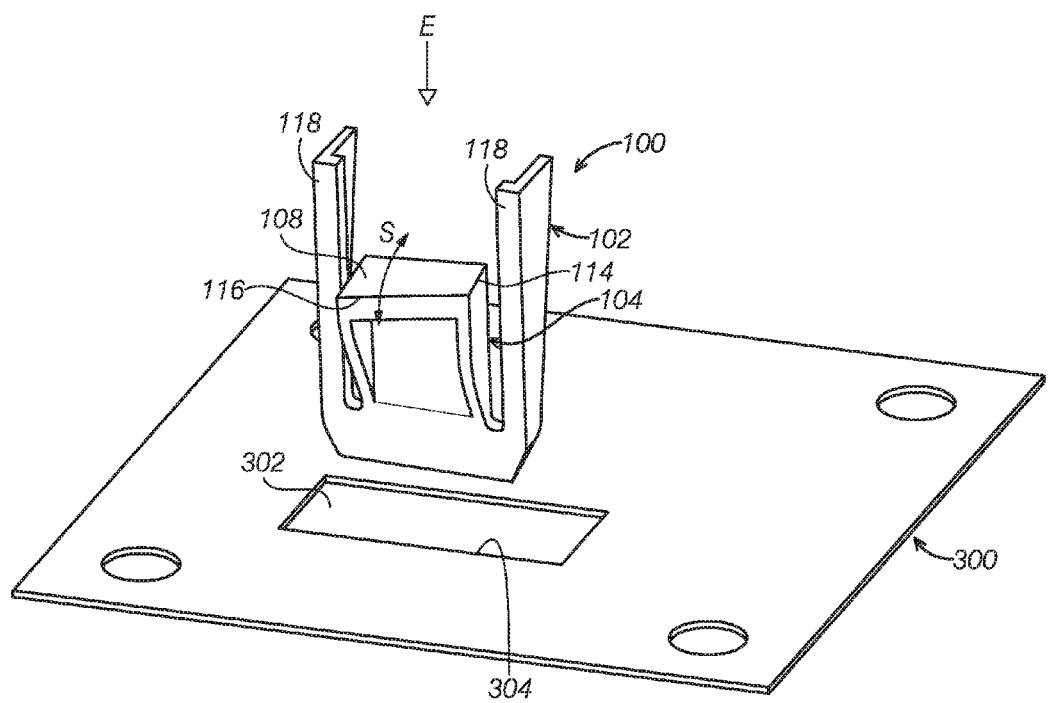
FIG. 7 is a perspective view of a clip and a connecting component at pre-engagement position.
Figure 8:
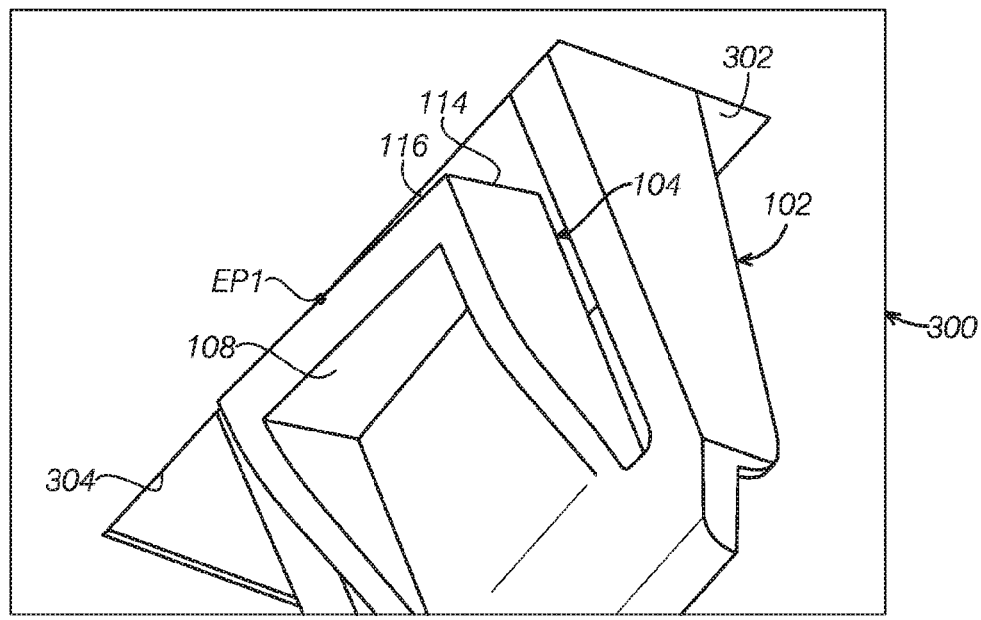
FIG. 8 is a perspective view of a clip and a connecting component, illustrating an engagement at a first clip edge of the clip.
Figure 9:
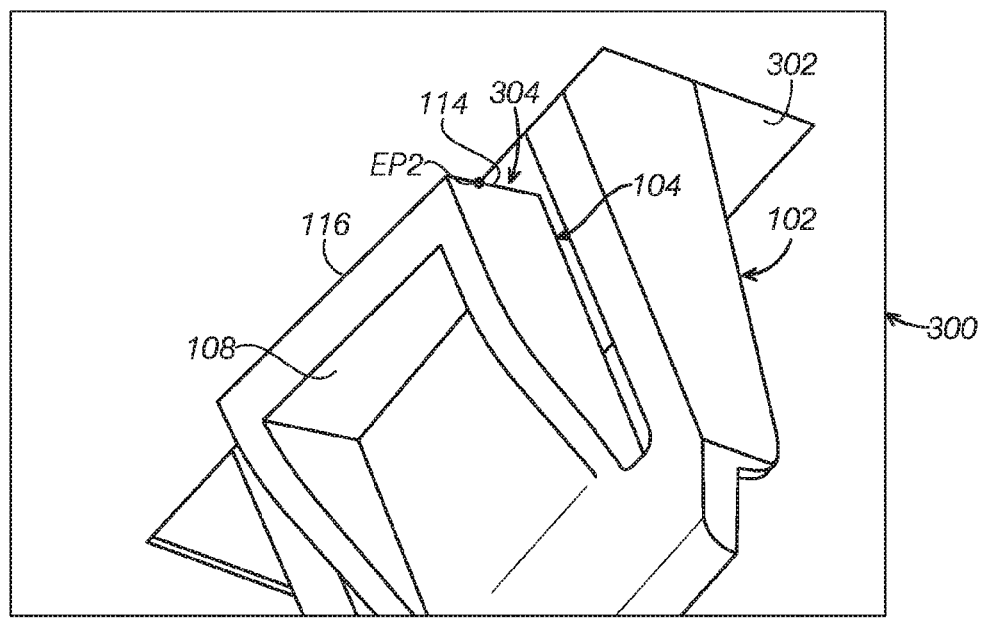
FIG. 9 is a perspective view of a clip and a connecting component, illustrating an engagement at a second clip edge of the clip.

With reference to FIGS. 7-9, the engagement of the clip 100 with a connecting component 300 is described. The clip base 102 may be connected to an engaging component (not shown). In one embodiment, the legs 118 of the clip base 102 may be connected to the engaging component. When the clip 100 is engaged with the connecting component 300, the engaging component is coupled with the connecting component 300. FIG. 7 shows that the clip 100 moves toward a clip retention opening 302 of the connecting component 300 in a clip engagement direction E. The clip retention opening 302 is enclosed by a clip engagement edge 304. The clip body 104 is configured to be rotatable in a path indicate by S. The clipping member 108 includes the first clip edge 114 and the second clip edge 116 that are to be engaged with the clip engagement edge 304.

As the clip 100 passes the clip retention opening 302, the clip body 104 swings back before the clipping member 108 contacts the clip engagement edge 304. Then, the clip body 104 swings forth toward the clip engagement edge 304. FIG. 8 shows that the second clip edge 116 of clipping member 108 engages with the clip engagement edge 304. An engagement position EP1 is illustrated in FIG. 8. The clip 100 allows the engagement to occur along the second clip edge 116. The engagement may be a point contact along the second clip edge 116. In this way, the clip 100 can make retention with the connecting component in a wider range or the clip 100 has a wider clamp range.

The clip 100 may move further to engage with the connecting component 200 along the first clip edge 114. As the clip moves further in the clip engagement direction E, the engagement point moves from the second clip edge 116 to the first clip edge 114. FIG. 9 shows that the first clip edge 114 engages the clip engagement edge 304 at an engagement position EP2. When the first clip edge 114 engages with the clip engagement edge 304, the clip body 104 may swing back to its original unsprang position. Again, the clip 100 makes a point contact with the clip engagement edge 304, and such configuration provides a wider clamp range.

The clip of the present disclosure includes a tapered surface with two clip edges. Either the first clip edge 114 or the second clip edge 116 can engage the connecting component. The engagement may be a point contact. The tapered clip of the present disclosure allows the clip to maintain the engagement with the connecting component in a wider clamp range and provide desired tolerance while maintaining sufficient clamp retention strength.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A tapered clip, comprising:
   a base including a top portion; and
   a clip body connected to the base and moveable relative to the base, wherein the clip body includes a support member connected to the top portion of the base and a clipping member protruded from an end of the support member over a surface of the supporting member, and wherein the clipping member includes a clip surface having a first clip edge and a second clip edge next to the first clip edge,
   wherein the first clip edge forms a first angle with a plane that is perpendicular to a clip engagement direction, and the second clip edge forms a second angle with the plane.

2. The tapered clip of claim 1, wherein the first clip edge and the second clip edge form an interior angle that is substantially equals to 90 degrees.

3. The tapered clip of claim 1, wherein the first clip edge and the second clip edge form an interior angle that is greater than 90 degrees.

4. The tapered clip of claim 1, wherein the first angle is different from the second angle.

5. The tapered clip of claim 1, wherein the clip surface is a flat surface.

6. The tapered clip of claim 1, wherein the clip body and the base are made from plastic, and wherein the clip body and the base are integrally formed.

7. The tapered clip of claim 1, wherein the base includes two legs extending from the top portion; and wherein the support member is disposed between the two legs.

8. The tapered clip of claim 7, wherein the clip body further includes sidewalls protruding from edges of the support member and connecting the clipping member and the sidewalls have a curved outer surface sloped to the top portion of the base.

9. A tapered clip, comprising:
   a base including a top portion; and
   a clip body including:
      a support member connected to the top portion of the base,
      a clipping member disposed on a free end of the support member, wherein the clipping member includes a first clip edge and a second clip edge, and the second clip edge is next to the first clip edge and opposite to the support member,
      wherein the clipping member has a tapered surface, in a X, Y, Z coordinate system with a Z axis parallel to a length direction of the base, projection of the first clip edge on a Y-Z plane forms a first angle with a Y axis, and projection of the second clip edge on a X-Z plane forms a second angle with an X-axis.

10. The tapered clip of claim 9, wherein projection of the second clip edge on a X-Y plane forms a third angle with the X axis.

11. The tapered clip of claim 10, wherein the clip body and the base are made from plastic, and the clip body and the base are integrally formed, and wherein the clip body is capable of rotating relative to the base.

12. The tapered clip of claim 9, wherein the first angle is different from the second angle.

13. The tapered clip of claim 9, wherein an interior angle between the first clip edge and the second clip edge substantially equals to 90 degrees.

14. The tapered clip of claim 9, wherein an interior angle between the first clip edge and the second clip edge is greater than 90 degrees.

15. A clip assembly, comprising:
   a connecting component including a clip retention opening with a clip engagement edge; and
   a clip to be engaged with the clip engagement edge of the connecting component, including
      a base including a top portion,
      a clip body connected to the base and moveable relative to the base, wherein the clip body includes a support member connected to the top portion of the base and a clipping member protruded from an end of the support member over a surface of the supporting member, and wherein the clipping member includes a clip surface having a first clip edge and a second clip edge next to the first clip edge, and
      wherein the first clip edge forms a first angle with a plane that is perpendicular to a clip engagement direction, and the second clip edge forms a second angle with the plane,
   wherein either the first clip edge or the second clip edge contacts the clip engagement edge of the connecting component when the clip is engaged with the connecting component.

16. The clip assembly of claim 15, wherein an interior angle between the first clip edge and the second clip edge substantially equals to 90 degrees.

17. The clip assembly of claim 15, wherein an interior angle between the first clip edge and the second clip edge is greater than 90 degrees.

18. The clip assembly of claim 15, wherein the clip body and the base are made from plastic, and wherein the clip body and the base are integrally formed.

19. The clip assembly of claim 15, wherein the base includes two legs extending from the top portion; and wherein the support member is disposed between the top portion of the base and the clipping member and between the two legs; and wherein the second clip edge is opposite to the surface.

20. The clip assembly of claim 19, wherein the clip body further includes sidewalls protruding from edges of the support member and connecting the clipping member and wherein the sidewalls have a curved outer surface sloped to the top portion of the base.

* * * * *